April 23, 1940.                F. WITTE                2,198,447
              SAFETY VALVE FOR STEAM GENERATORS
                     Filed Jan. 28, 1939

INVENTOR:
FRIEDRICH WITTE
BY Haseltine, Lake & Co.
ATTORNEYS

Patented Apr. 23, 1940

2,198,447

UNITED STATES PATENT OFFICE 2,198,447

SAFETY VALVE FOR STEAM GENERATORS

Friedrich Witte, Berlin, Germany, assignor to Knorr-Bremse Aktiengesellschaft, Lichtenberg, Berlin, Germany, a joint-stock company of Germany Application January 28, 1939, Serial No. 253,459
In Germany April 12, 1937

2 Claims. (Cl. 137—53)

This invention relates to safety valves for steam generators, designed as high-lift safety valves.

The known high-lift safety valves possess certain imperfections, one of which is in the construction and arrangement of the valve spring due to the fact that the valve spring is designed as a cylindrical or helical spring, and arranged in a closed space between the outside of the cylindrical projection on the bell shaped valve body acting as a spring guide and the inside of the hollow valve body enclosing the said spring guiding projection. The spring is thus exposed to the action of the steam escaping through the opened valve; thus it is heated to a high degree which affects its characteristics; in addition the stresses occurring in the said spring are unfavourable in so far as the spring is exposed to bending and at the same time to torsional stresses owing to its design as a helical spring. Finally, its design as a helical spring entails a certain length, and in view of the high position of the steam boiler in modern steam locomotives this is an undesirable feature, and consequently the value of any measure adopted to reduce the height of the safety valve on steam locomotives will be readily appreciated.

The above indicated drawbacks of the known safety valves are according to the invention eliminated by utilizing a torsion rod spring as a valve spring, said torsion rod spring being accommodated externally of the valve housing and thus withdrawn from the influence of the heat of the steam. Moreover a valve spring of this kind offers the advantage of not being exposed to composite stresses, being merely subjected to torsional stress, and finally it quite considerably reduces the constructional height of the valve, and consequently the safety valves can be arranged centrally along the top of the boiler even where the boiler occupies the highest position on the locomotive. At the same time the stress upon the spring is lower, despite the reduced constructional height, than it would have been had a helical spring been retained, and shortened to suit the reduced height of the safety valve. Two parallel torsion rods located externally of the valve housing and if desired placed in a separate housing, are firmly connected to one another at their ends in such a manner as to resist torsion, and a lever is attached to each of said rods, the free end of one lever bearing against a fixed point of the valve housing, whilst the corresponding end of the other lever is supported upon the vertically displaceable valve spindle.

In order that the said invention may be clearly understood and readily carried into effect, the same will now be further described with reference to the accompanying drawing, wherein.

Figure 1:
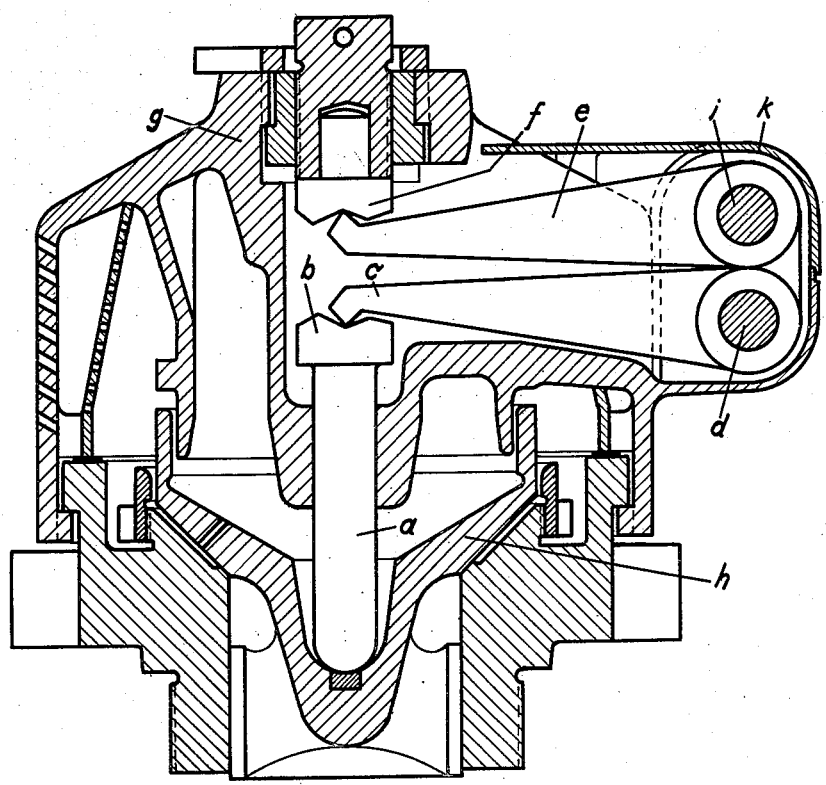
Figure 1 illustrates in vertical longitudinal section a safety valve according to the invention.
Figure 2:
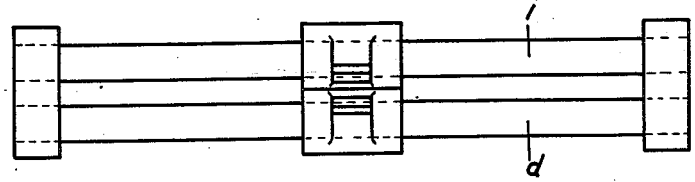
Figure 2 illustrates the valve spring constituted by torsion rods, viewed from the left side in Figure 1.

The valve spindle $a$ ends in a bearing like portion $b$ acting as a support for the free end of a lever $c$, which is attached to a torsion rod $d$, which, as may be seen in Figure 2 is rigidly connected at its ends by rigid connecting pieces to a second parallel torsion rod $i$; alternatively the two rods may constitute a single component in the manner of an extended chain link. Opposite the lever $c$ there is attached to the rod $i$ a similar lever $e$, the free end of which is located upon a bearing $f$ corresponding to the support $b$ and being rigidly arranged in the valve housing $g$. The spring formed by the torsion rods $d$ and $i$ is encased by a portion $k$ of the valve housing.

When the valve body $h$ rises owing to the pressure in the boiler exceeding the permissible normal amount, the lever $c$ moves clockwise according to the valve lift, whilst the lever $e$ remains stationary. The rotation is partly transmitted to the torsion rod $i$. The spring formed by the torsion rods $d$ and $i$ is exposed only to torsional stress. It is advantageous to design the bearing surfaces of the ends of the levers $c$ and $e$ in the form of sharp edges so that variations in the bearing surface can have substantially no appreciable influence upon the spring tension.

What I claim and desire to secure by Letters Patent of the United States is:

1. In a safety valve for a steam generator, a valve spindle, a closing spring arrangement opposing lifting movement of said spindle, said arrangement comprising a pair of parallel torsion rods rigidly connected with one another at each end, a pair of substantially parallel horizontal levers, each rigidly secured at one end to one of said torsion rods at a position intermediate the ends of said rods, an abutment bearing in the valve casing directly above said spindle and one of said levers disposed to have its free end in engagement with the abutment, the second of said levers having its free end engaging said valve spindle and operable by lifting movement thereof to place both rods in torsion against the resistance of said first lever engaged with said abutment bearing, the abutment bearing and the adjacent end of the valve spindle being axially alined and having enlarged heads engaged by the free ends of said levers.

2. In a safety valve for steam generators, a valve spindle, a closing spring arrangement opposing lifting movement of said spindle, said arrangement comprising a pair of parallel torsion rods rigidly connected with one another at each end, a pair of substantially parallel horizontal levers, each rigidly secured at one end to one of said torsion rods at a position intermediate the ends of said rods, an abutment bearing in the valve casing directly above said spindle and one of said levers disposed to have its free end in engagement with the abutment, the second of said levers having its free end engaging said valve spindle and operable by lifting movement thereof to place both rods in torsion against the resistance of said first lever engaged with said abutment bearing, the abutment bearing and the adjacent end of the valve spindle being axially alined and having enlarged heads engaged by the free ends of said levers, said enlarged heads having recesses therein, the sides of said recesses mutually forming obtuse angles and the free ends of both of said levers respectively engaging in said recesses in the enlarged heads of the spindle and abutment bearing having projections of acute angular shape for engaging said recesses with contact surfaces too small for variations in said contact surfaces to produce any effective variations in the spring action.

FRIEDRICH WITTE.